(12) United States Patent
Doubet (10) Patent No.: US 10,414,420 B1
(45) Date of Patent: Sep. 17, 2019

(54) APPARATUS FOR HAULING AND STORING SUPPLIES

(71) Applicant: Justin T. Doubet, Parker, CO (US)

(72) Inventor: Justin T. Doubet, Parker, CO (US)

( * ) Notice: Subject to any disclaimer, the term of this patent is extended or adjusted under 35 U.S.C. 154(b) by 0 days.

(21) Appl. No.: 16/270,234

(22) Filed: Feb. 7, 2019

Related U.S. Application Data

(63) Continuation of application No. 15/990,669, filed on May 27, 2018, now Pat. No. 10,246,112.

(51) Int. Cl.
*B62B 1/04* (2006.01)
*B62B 1/26* (2006.01)

(52) U.S. Cl.
CPC ............... *B62B 1/04* (2013.01); *B62B 1/264* (2013.01)

(58) Field of Classification Search
CPC .. B62B 1/22; B62B 1/26; B62B 1/202; B62B 1/264; B62B 3/02; B62B 3/104; B62B 2202/028; B62B 2203/40
See application file for complete search history.

(56) References Cited

U.S. PATENT DOCUMENTS

| | | | | |
|---|---|---|---|---|
| 5,464,104 A | * | 11/1995 | McArthur | A47F 5/0025 211/133.3 |
| 7,500,681 B2 | * | 3/2009 | Steadman | B62B 1/14 280/47.131 |
| 8,915,505 B2 | | 12/2014 | Plesh et al. | |
| 2012/0139200 A1 | * | 6/2012 | Plesh | B62B 1/12 280/47.18 |

OTHER PUBLICATIONS

"Sullivan Supply—Texas—Sullivan's Showcase Dolly", Web-published by Sullivan Supply, Inc., printed from http://www.sullivansupply.com/cart/tx/p-1486-sullivans-showcase-dolly.aspx on Apr. 9, 2018. 2 pages.
"Sullivan Supply—Texas—Sullivan's Feed Bucket Hanger", Web-published by Sullivan Supply, Inc., printed from http://www.sullivansupply.com/cart/tx/p-1488-sullivans-feed-bucket-hanger.aspx on Apr. 9, 2018. 2 pages.
"Sullivan's Bucket Caddy", in Sullivan Supply catalog published by Sullivan Supply, Inc., vol. 28, 2018 (month and day unknown), p. 82.
"Round Bucket Cart", Web-published by Weaver Leather, LLC, printed from https://www.thewinnersbrand.com/catalog/item-detail/69-5133/round-bucket-cart/pr_50786/cp_/shop-now/equipment/bucket-carts on Oct. 10, 2018. 2 pages.
"Square Bucket Cart", Web-published by Weaver Leather, LLC, printed from https://www.thewinnersbrand.com/catalog/item-detail/69-5132/square-bucket-cart/pr_50785/cp_/shop-now/equipment/bucket-carts on Oct. 10, 2018. 2 pages.
Justin T. Doubet, U.S. Appl. No. 15/990,669, filed May 27, 2018, Office Action, dated Oct. 1, 2018, 12 pages.

* cited by examiner

*Primary Examiner* — Bryan A Evans
(74) *Attorney, Agent, or Firm* — Marcia L. Doubet (57) ABSTRACT

An improved apparatus for hauling supplies, including, but not limited to, supplies held in buckets or other containers. The disclosed apparatus also provides improvements for supply storage. An embodiment provides removably attached racks, the racks being adapted for storing removable containers when attached, and is configured for storing the racks thereupon when detached. In an optional aspect, a removably attached suspension member provides for additional supply storage, and the suspension member may also be stored upon the apparatus when detached. Supplies may be stored upon the apparatus while it is stationary, and may also be hauled from place to place using the apparatus.

27 Claims, 9 Drawing Sheets

APPARATUS FOR HAULING AND STORING SUPPLIES

BACKGROUND

The present invention relates to an improved apparatus for hauling supplies, including, but not limited to, buckets or other containers. The disclosed apparatus also provides improvements for supply storage.

Livestock need various types of care, and are often exhibited in competitions. Various types of supplies are needed for this livestock care, and for preparing the livestock for the competitions, and it may be somewhat burdensome to haul and/or store these supplies.

BRIEF SUMMARY

The present invention is directed to an apparatus for hauling and/or storing supplies. In one aspect, an apparatus comprises: a vertical frame portion, the vertical frame portion configured with at least one pair of mounting brackets, the mounting brackets of the pair being attached to opposing sides of the vertical frame portion at a particular vertical height, the mounting brackets of the pair adapted for removable attachment of a storage rack, the storage rack comprising an open frame in which at least one container for holding supplies is suspendable and configured with a pair of mounting arms extending from the open frame in a perpendicular direction and coplanar therewith, wherein an outer dimension of the mounting arms is adapted for removably sliding within the mounting brackets to provide the removable attachment; a horizontal base portion attached to a bottom end of the vertical frame portion; a pair of rotatable wheels connected to an axle, the axle being connected to the vertical frame portion; and at least one pair of support members attached to the vertical frame portion for hanging the storage rack therefrom when detached, the support members of the pair being attached to opposing sides of the vertical frame portion at a same vertical height. In an embodiment, the axle is placed such that the wheels and the horizontal base portion simultaneously contact a horizontal surface when the apparatus is upright. In another aspect, the vertical frame portion is configured with two pairs of mounting brackets, the mounting brackets of the first pair being attached to opposing sides of the vertical frame portion at a first vertical height and the mounting brackets of the second pair being attached to opposing sides of the vertical frame portion at a second vertical height, the mounting brackets of the first pair adapted for removable attachment therewith of a first storage rack and the mounting brackets of the second pair adapted for removable attachment therewith of a second storage rack, the first storage rack and the second storage rack each comprising an open frame in which at least one container for holding supplies is suspendable and each configured with a pair of mounting arms extending from the open frame in a perpendicular direction and coplanar therewith, wherein an outer dimension of the mounting arms of the first frame is adapted for removably sliding within the mounting brackets of the first pair and an outer dimension of the mounting arms of the second frame is adapted for removably sliding within the mounting brackets of the second pair, and the pair of support members is adapted for simultaneously hanging the first storage rack when detached and the second storage rack when detached. In an embodiment, a storage rack stores a plurality of containers. A storage rack is preferably adapted for interchangeably suspending therein a plurality of container shapes. A second pair of support members may be provided for supporting the hanging storage rack(s). The apparatus may further comprise a handle portion attached to a top end of the vertical frame portion. The opposing sides of the vertical frame portion may each have an open terminal end at a top end thereof, and the apparatus may further comprise a removably attachable suspension member adapted for suspending supplies from the apparatus when attached thereto, the suspension member comprising a side member configured with a pair of suspension member mounting arms extending perpendicularly therefrom and coplanar therewith, wherein an outer dimension of the suspension member mounting arms is adapted for removably sliding within the open terminal ends of the frame portion to provide the removable attachment of the suspension member. The support members may be adapted for simultaneously hanging the storage rack(s) when detached and the suspension member when detached. A method for hauling and storing supplies comprises storing a plurality of supplies upon the apparatus and hauling the supplies from a first physical location to a second physical location while the supplies are stored upon the apparatus.

Various embodiments of these and other aspects of the present invention may be provided in view of the present disclosure. It should be noted that the foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined by the appended claims, will become apparent in the non-limiting detailed description set forth below.

BRIEF DESCRIPTION OF THE SEVERAL VIEWS OF THE DRAWINGS

The present invention will be described with reference to the following drawings, in which like reference numbers denote the same element throughout.

DETAILED DESCRIPTION

As noted earlier, livestock need various types of care, and are often exhibited in competitions. Competitions may range from county fairs or other primarily local endeavors to international exhibitions, and the competitors who exhibit their livestock may range from little children to adults. Livestock are generally transported from a farm or ranch where they are being raised to another site—such as a fairgrounds—where the competition will take place. The livestock may spend anywhere from a day to a week, and possibly longer, at the site of the competition. Accordingly, it is necessary to haul supplies to the site in order to care for the livestock, and the supplies must then be stored while at the site.

Examples of the supplies needed for livestock care at the site of a competition include feedstuffs, grooming brushes, veterinary supplies to address potential livestock illness that might arise, and so forth. The livestock and the supplies will typically be offloaded from a transportation vehicle in a common area outside a barn or other shelter (referred to hereinafter as a "barn" for ease of reference). The livestock are commonly herded, on foot, from the offload area to a space within the interior of the barn that has been assigned to the exhibitor of the livestock—where this assigned space may be located at a considerable distance from the offload area. The supplies are commonly hauled by one or more persons from the offload area to the assigned space. It will be appreciated that it is tiring work, at best, for a person to manually move the supplies from the offload area to the assigned space—particularly if the amount of supplies is more than the person can physically carry in a single trip. The feedstuffs, for example, may be transported in 5-gallon buckets, each of which may weigh on the order of 20 to 50 pounds, and it may be common to need multiple such buckets. Thus, it can be seen that hauling the supplies to the exhibitor's assigned space may be burdensome.

Storing the supplies while at the competition site often presents challenges as well, as the physical space for placement of the supplies in a location that is convenient to the exhibitor's assigned space may be limited. In particular, physical floor space is often quite limited. Physical storage space is also often limited in a transport vehicle while supplies are in transport between a farm or ranch and the competition site.

An embodiment of the present invention is directed toward alleviating the difficulty of hauling supplies and also provides enhanced storage capabilities therefor. The term "haul" is used herein primarily to refer to moving supplies from place to place, using the disclosed supply hauler, and the term "store" is used herein primarily to refer to supplies that are stationary, in a single location. However, it should also be noted that a benefit of an embodiment of the present invention is that supplies may be stored upon the disclosed supply hauler while the combination thereof is itself in transport—for example, while the supplies and the hauler are being transported between locations such as a farm or ranch and a competition site—without having to first remove the supplies from the disclosed hauler. Because the disclosed hauler is adapted for improved hauling and for improved storage, and for ease of reference, the term "hold" (and derivations thereof) as used herein should be construed as referring to using the disclosed hauler both for hauling supplies and/or for supply storage. It should also be noted that the disclosed hauler may be used advantageously for hauling and/or storing supplies without regard to the location at which it is used, and thus references herein to livestock competition sites are merely by way of illustration and not of limitation.

A preferred embodiment of the disclosed apparatus is configured for holding supplies in containers, of which a preferred container type is buckets. Optionally, an embodiment may also be configured for holding supplies in a container referred to as a "show box". These container types will now be described in more detail.

One typical supply needed for livestock is livestock feed, and these feedstuffs are commonly stored in buckets. It is noted that a common bucket size is a 5-gallon bucket, and that 5-gallon buckets are found in two general shapes: (1) having a generally round outer shape and (2) having a generally square outer shape (typically with somewhat rounded corners). In a preferred embodiment, multiple containers—which, in a further preferred embodiment, are buckets having a 5-gallon capacity—may be held simultaneously using the improved apparatus disclosed herein. An embodiment of the present invention may simultaneously hold buckets in either of the conventional round or square shapes, and in addition, a mixture of bucket shapes may be held simultaneously by an embodiment of the present invention. A preferred embodiment (as will be discussed in further detail below with reference to the figures) is configured to haul five 5-gallon buckets simultaneously. Note, however, that an embodiment may be used for holding fewer than the maximum configuration of buckets without deviating from the scope of the present invention. In addition, an embodiment may be configured for other maximum quantities of buckets and/or other bucket sizes and/or other types of containers without deviating from the scope of the present invention.

Certain supplies are used at a livestock competition, such as grooming brushes and so forth, and are commonly stored together in a container referred to as the above-noted "show box". In an optional aspect, an embodiment of the present invention may be configured for holding supplies of this type. A show box may measure on the order of 4 feet long, 1 to 2 feet wide, and 1 to 2 feet tall (by way of illustration but not of limitation). The show box itself may be constructed of metal or wood, by way of example, and may be relatively heavy even when empty (on the order of 30 to 40 pounds). When supplies are stored within the show box, the weight is obviously increased. As a result, picking up the show box may require two people, and thus it may be burdensome to carry a show box manually from an offload area outside a barn and into the barn to the exhibitor's assigned space. One benefit of an embodiment of the present invention is that the show box can be removably secured to the supply hauler, and thus the show box and its contents can be hauled and/or stored, using the supply hauler disclosed herein, simultaneously with the above-described buckets. Optionally, the disclosed supply hauler may be used to haul and/or store a show box without the buckets being simultaneously placed in the hauler. (And as noted, configuring the supply hauler for use with the show box is an optional aspect of the present invention, and thus the disclosed supply hauler may be used to haul and/or store the buckets without the show box.)

Figure 1:
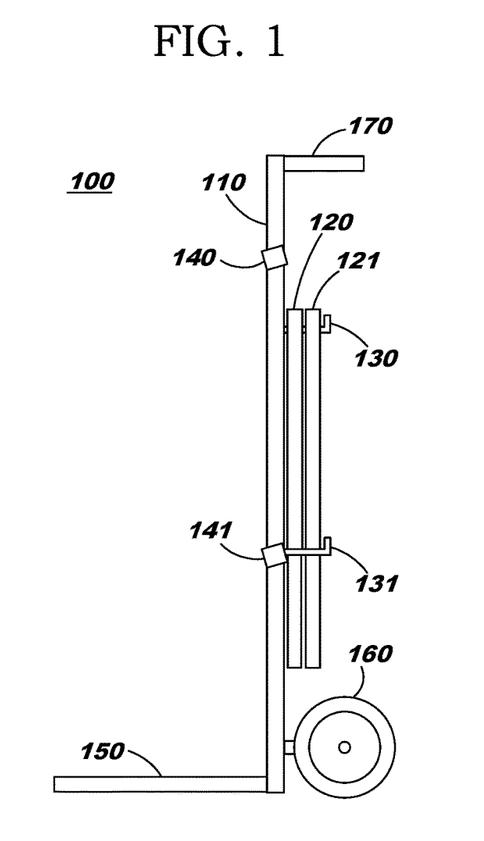
FIG. 1 depicts an embodiment of an apparatus according to the present invention, showing a side view thereof and illustrating how racks attachable to a front of the apparatus may be stored on the back of the apparatus using provided supports.
Figure 1A:
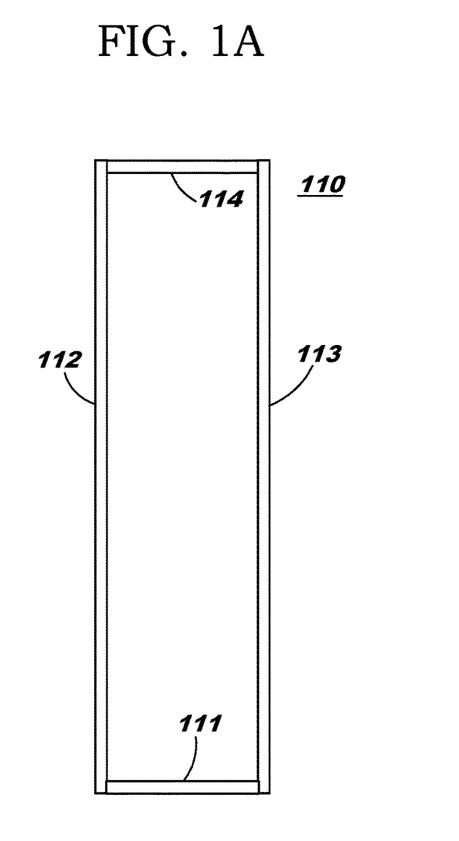
FIGS. 1A and 1E depict front views of a portion of the apparatus shown in FIG. 1 (noting that FIG. 1E illustrates an optional aspect)
Figure 1B:
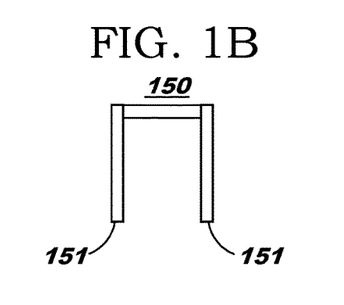
FIGS. 1B-1D depict top views of portions of the apparatus (noting that the portion shown in FIG. 1D is an optional aspect)
Figure 1C:
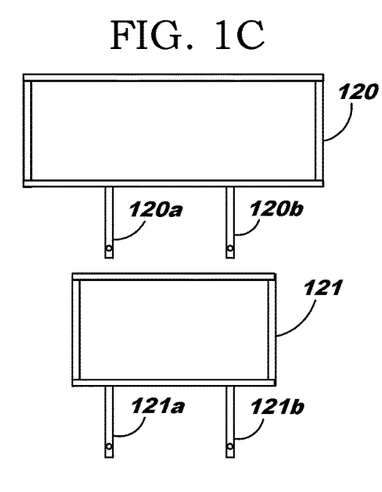
Figure 1D:
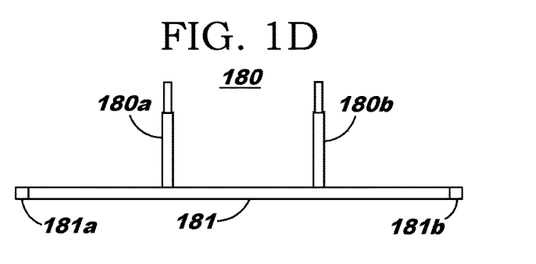
Figure 1E:
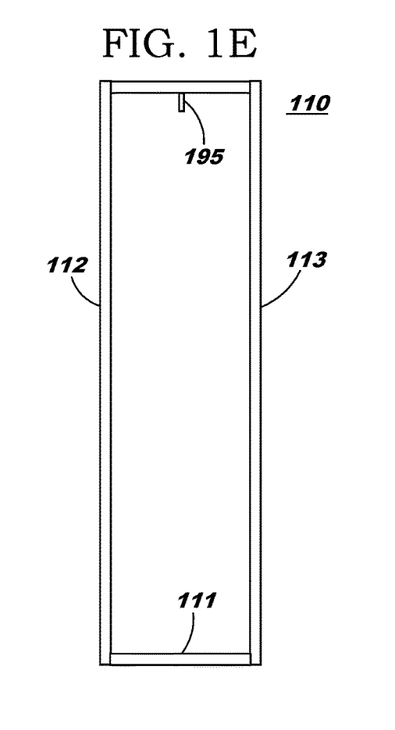

Referring now to the figures, FIG. 1 depicts a side view of an embodiment of the present invention, where this side view illustrates how racks attachable to a front of the apparatus may be stored on the back of the apparatus using provided supports. (See also the discussion of FIG. 2, below, which depicts another side view of the apparatus illustrated in FIG. 1 and illustrates how the racks may be removably attached to the front of the apparatus using provided points of attachment.) FIGS. 1A-1C illustrate further details of features shown in FIG. 1, and FIGS. 1D-1E illustrate further optional aspects. These figures will now be discussed in more detail.

In an embodiment as illustrated in FIG. 1, the apparatus 100 includes a vertical frame portion 110, a horizontal base portion 150, a horizontal handle portion 170, and wheels 160. Preferably, the vertical frame portion 110 and the horizontal base portion 150 are constructed of hollow metal tubes, where the hollow metal tubes are generally square in nature and are then cut and welded together to form a frame shape having an open center area (referred to equivalently herein as an "open frame" or "open frame shape"). Preferably, the metal is steel. The horizontal handle portion 170 is an optional aspect, and when present, is also preferably constructed of these hollow metal tubes. (The same type of metal tubes are preferably used to construct the racks and suspension member as shown in FIGS. 1C-1D, which are discussed below.) Note that because FIG. 1 is a side view of apparatus 100 shown without perspective, only the rightmost vertical side (where "left" and "right" are as viewed from a front side of the apparatus as shown in FIG. 1) of frame portion 110, the rightmost horizontal side of base portion 150, the rightmost horizontal side of handle 170, and the rightmost wheel 160 are viewable therein.

FIG. 1 also illustrates mounting brackets 140, 141. These brackets are preferably constructed of the above-discussed hollow metal tubes and are preferably attached to the outer edge of frame portion 110 by welding. Notably, both the front and back ends of the mounting brackets 140, 141 are open in a preferred embodiment, providing an attachment point for receiving mounting arms of detachable racks 120, 121. In a preferred embodiment, the mounting brackets 140, 141 are positioned such that the open front end extends downward at an angle of 15 degrees from horizontal (equivalently, 105 degrees from vertical). For further details, refer to the discussion of FIG. 2, below, which shows the racks as removably attached to the supply hauler using the mounting brackets 140, 141. (Again, because FIG. 1 is a side view of apparatus 100 shown without perspective, only the rightmost mounting brackets 140, 141 are viewable therein, but it will be understood that these brackets are disposed in corresponding pairs.)

The optional horizontal handle portion 170 shown in FIG. 1 may be configured as a corresponding pair of pieces of hollow metal tubes, with or without a connection therebetween. This handle portion 170 may be beneficial when moving the apparatus 100 from place to place, for example by tipping the apparatus somewhat downward and using handle portion 170 for pulling. Optionally, open ends of the hollow metal tubes of handle portion 170 may be plugged with caps made from plastic or another substance.

FIGS. 1A-1E illustrate further details of features of the apparatus as shown in FIG. 1, and will now be described. (While not illustrated in further detail in FIGS. 1A-1E, it should be understood that the wheel 160 shown in FIG. 1 is one of a pair of wheels.)

FIG. 1A provides a front view of vertical frame portion 110, illustrating the shape thereof as a generally rectangular 4-sided open frame in which the overall height is considerably larger than the overall width. In one embodiment, the height of frame portion 110 is 50 inches and the width thereof is 11 inches. FIG. 1B provides a top view of horizontal base portion 150, illustrating the shape thereof as a generally rectangular 3-sided open frame in which the overall length may be somewhat larger than the overall width. In one embodiment, the length of base portion 150 is 15 inches and the width thereof is 11 inches. It will be noted that the frame portion 110 permanently attaches to the base portion 150, in the depicted embodiment of FIG. 1, by affixing the bottom portion 111 of frame portion 110 (as shown in FIG. 1A) to the back edges 151 of base portion 150 (as shown in FIG. 1B). Preferably, the attachment is made by welding. Note that while the frame portion 110 and base portion 150 are shown as having 4 sides and 3 sides, respectively, in an alternative embodiment, a fourth side made be added to base portion 150 if desired (for example, extending between or across edges 151); or, in combination with such 4-sided configuration of base portion 150, the bottom portion 111 may be omitted from frame portion 110. (It should be noted that while the sides of frame portion 110, base portion 150, and racks 120, 121 are illustrated in FIGS. 1A-1C as meeting together in a particular configuration, this is by way of illustration and not of limitation. For example, while FIG. 1A shows bottom portion 111 as extending between the inner edge of left side 112 and right side 113, one alternative is to place the bottom portion 111 so that it spans from the outer edge of left side 112 to the outer edge of right side 113.)

FIG. 1 further illustrates detachable racks 120, 121 and supports 130, 131 which are affixed to the back of the apparatus. While FIG. 1 shows racks 120, 121 in a configuration where the racks are detached and hanging from the apparatus using supports 130, 131, the side view shown in FIG. 2 (discussed in further detail below) depicts the racks as being removably attached to the apparatus 100 in a configuration where each rack 120, 121 is usable for suspending therein a plurality of buckets. (FIGS. 6 and 7, also discussed below, depict views in which buckets are being suspended in the racks.) In a preferred embodiment, the racks 120, 121 are constructed of hollow metal tubes that are generally square in nature and which are cut and welded into an open frame shape. FIG. 1C illustrates a top view of racks 120, 121, showing the shape of each rack as a generally rectangular 4-sided open frame in which the overall length is larger than the overall width, and having a pair of mounting arms (see 120a, 120b and 121a, 121b) extending therefrom in a perpendicular orientation and coplanar therewith. The mounting arms are discussed in further detail below, with reference to FIG. 2. Preferably, the length and width of racks 120, 121 are selected in view of an outer dimension of a container to be stored in a rack. An embodiment of the present invention leverages conventions for container shapes for suspending one or more containers within a rack. By way of illustration but not of limitation, a container is discussed herein as being a 5-gallon bucket.

It is noted that 5-gallon buckets are conventionally constructed to have generally a standard height and outer dimension, such that the width of a square 5-gallon bucket is generally the same as the diameter of a round 5-gallon bucket (give or take a small variance). As an example, if a round 5-gallon bucket generally has a diameter of 9 inches, then the width of a square 5-gallon bucket is generally also 9 inches. It is noted that 5-gallon buckets are also conventionally constructed to include a lip area and a removable lid, where the lip area comprises one or more protrusions that extend horizontally outward from the side of the bucket in order to provide a convenient mechanism for removably attaching the lid. The bucket may also include a handle, in which case the handle generally attaches to the bucket using protrusions placed on opposing exterior sides of the bucket. In some cases, the bucket diameter or width is somewhat tapered, such that it is smaller at the bottom than at the top. In view of a conventional 5-gallon bucket shape, the width of racks 120, 121 is preferably selected such that an inside width of the frame thereof is on the order of the outer width of a square 5-gallon bucket and at the same time, on the order of the outer diameter of a round 5-gallon bucket, less a relatively small tolerance factor. And, the inside lengths of racks 120, 121 (shown in FIG. 1C as being different for each rack, by way of illustration but not of limitation) is preferably selected as a multiple of the bucket measurement (optionally, less a relatively small tolerance factor).

Accordingly, using the above-discussed example of buckets having an outer dimension of 9 inches, the inside frame width of racks 120, 121 for an embodiment of the present invention is selected as 9 inches less a tolerance factor that allows a snug fit for suspending a bucket within the rack, while preventing the bucket from falling through the rack (and still allowing for relatively easy removal therefrom). In one embodiment, this tolerance factor reduces the inside frame width by 4 millimeters.

Referring now to the rack length, it will be noted, with reference to the illustration in FIG. 1C, that rack 121 is shorter in length than rack 120 (although this is by way of illustration and not of limitation). In this depicted embodiment, rack 121 is configured to simultaneously hold 2 5-gallon buckets (side by side) while rack 120 is configured to simultaneously hold 3 5-gallon buckets (side by side). Accordingly, in the above-discussed example where the outer bucket dimension is 9 inches, the inside frame length of rack 120 and rack 121 for an embodiment of the present invention is selected as 27 inches and 18 inches, respectively. (Optionally, the inside frame length may also include a tolerance factor similar to that described above with regard to the width, although in one embodiment, a decrease in the inside frame length is not deemed to be necessary in preferred embodiments.)

Returning now to the discussion of FIG. 1, in the depicted embodiment, the supports 130, 131 are configured as being permanently mounted to the back of the apparatus 100, preferably extending therefrom as a generally "L-shaped" member attached at a right angle to the back of frame portion 110 and extending in a horizontal orientation for a distance that is suitable for storing the racks, then extending upwardly in a vertical orientation for a distance suitable for preventing the racks from sliding free of the support. The supports 130, 131 are preferably constructed from a solid metal rod that is bent into the L-shape, and this metal is preferably steel. Preferably, supports 130, 131 are attached to the back side of frame portion 110 by welding. While only a rightmost support member 130, 131 is depicted in FIG. 1, it will be appreciated that this is a side view without perspective, and it should be understood that a pair of support members 130 and a pair of support members 131 are provided in this embodiment. Accordingly, with reference to further details shown in FIG. 1A, the side view shown in FIG. 1 depicts the support members attached to side 113 of frame portion 110; corresponding support members also attach to side 112, but are not visible in FIG. 1. In one embodiment, the horizontal span of the support members is 4 inches and the vertical span is 2 inches, plus or minus some variation. This size is deemed to be suitable for hanging 2 racks constructed from tubular steel that is approximately 1 inch in width and height, along with the optional suspension member discussed below with reference to FIG. 1D. Supports having other dimensions may be used without deviating from the scope of the present invention.

Figure 6:
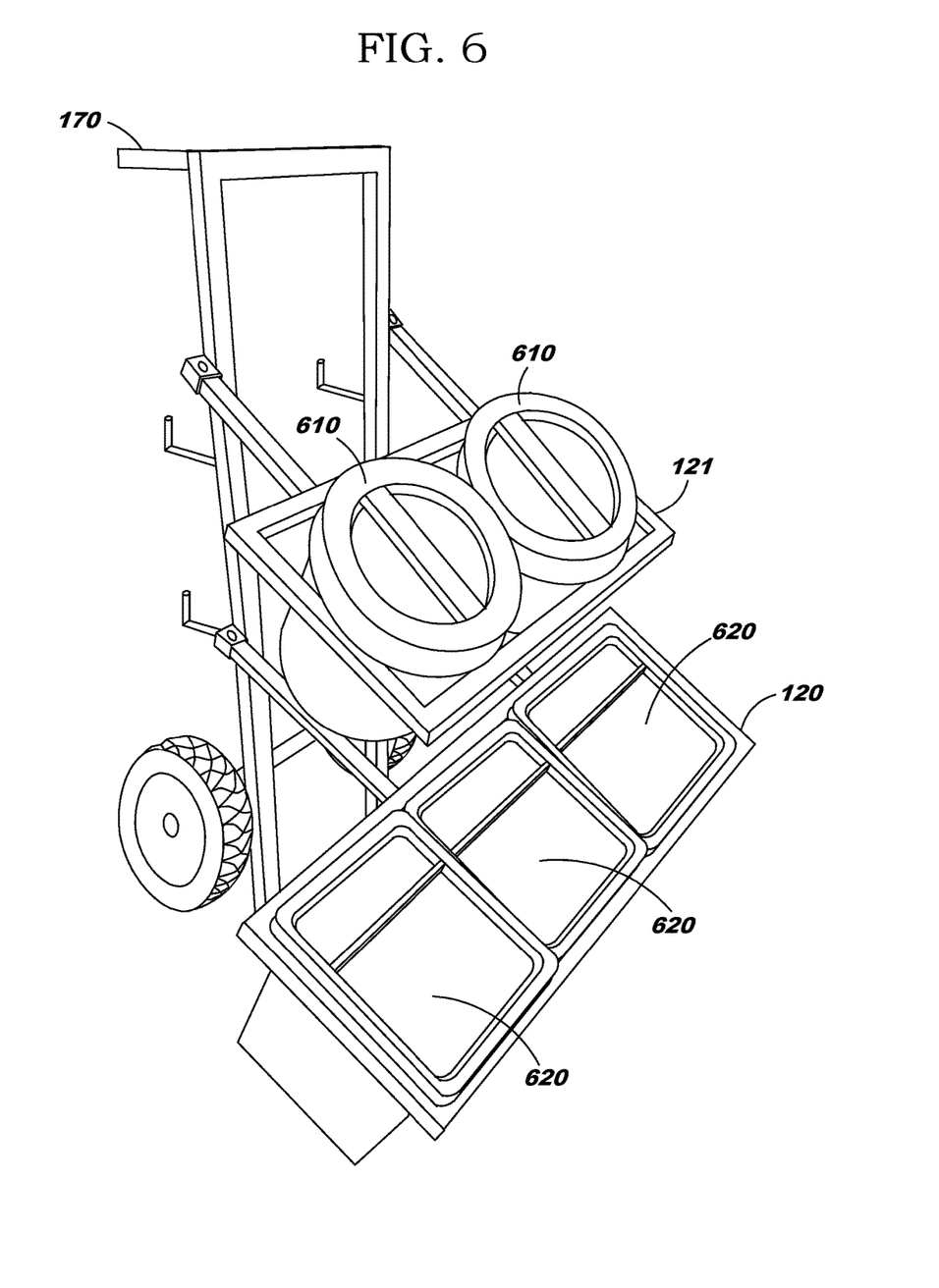
FIG. 6 depicts a perspective view in which a plurality of buckets are suspended in removably attached racks of an embodiment of an apparatus as disclosed herein.
Figure 7:
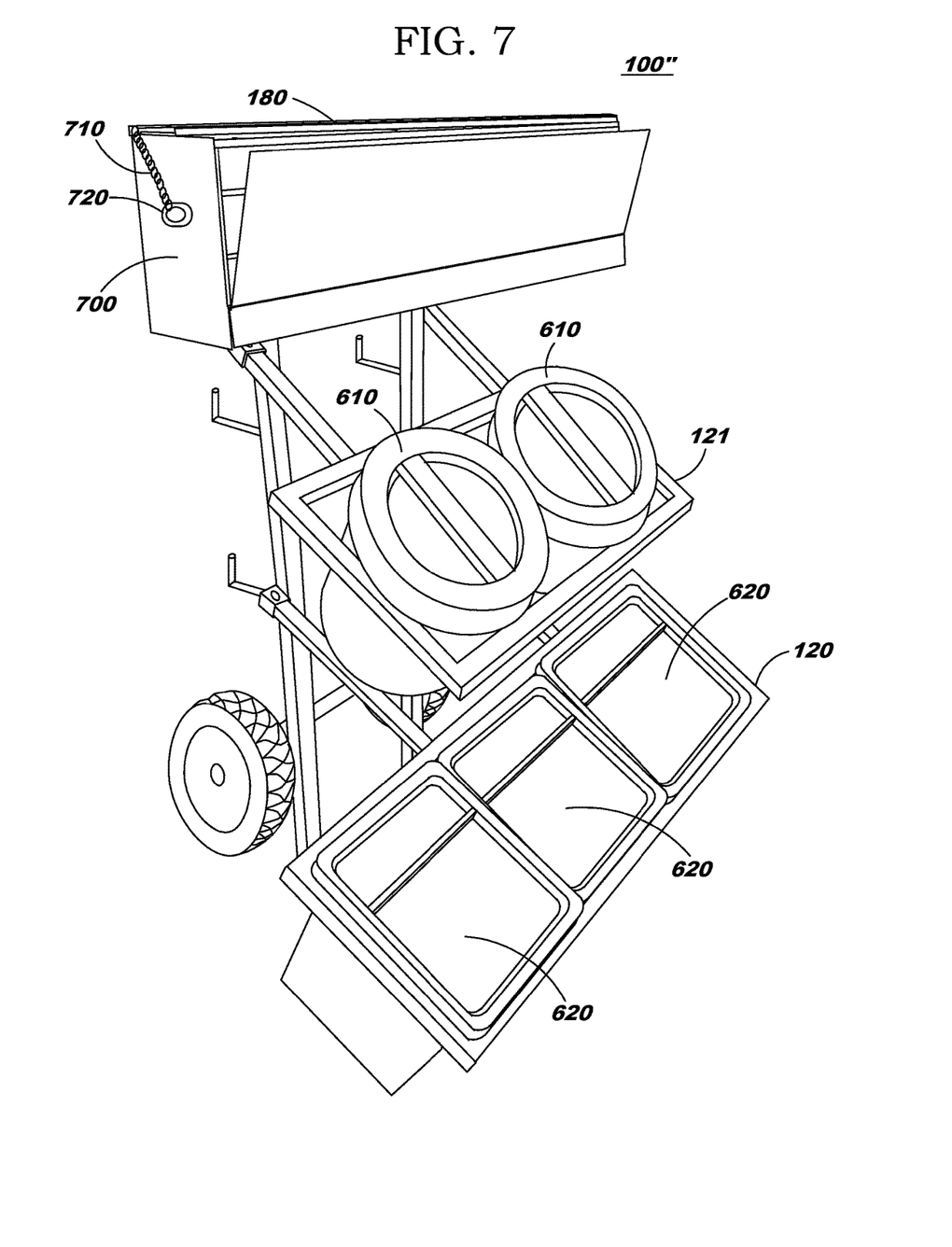
FIG. 7 depicts an augmented perspective view in which the buckets are suspended in the racks and in which a show box is suspended from the optional aspect of FIG. 1D.

It will be appreciated that the placement of horizontal base portion 150 serves to prevent the apparatus 100 from tipping forward, which is of particular importance when the apparatus is in use (as illustrated by FIGS. 6 and 7) with one or more buckets suspended in the racks 120 and/or 121.

FIG. 1D depicts a top view of a removably attachable suspension member 180 that may be used in an optional aspect of an embodiment. Frame portion 110 may be configured such that sides 112, 113 are hollow metal tubes in which each tube has an open terminal end at the top. Accordingly, a preferred embodiment of removably attachable suspension member 180 includes mounting arms 180a, 180b that extend in a perpendicular direction from side 181 and are coplanar therewith, where an outer dimension of these mounting arms is chosen so as to removably slide within the open terminal ends of the sides 112, 113 of frame portion 110. When mounted in this manner, suspension member 180 combines with frame portion 110 to provide relatively sturdy support. (See FIGS. 2A and 2C, discussed below, for a side view and top view illustration of the an embodiment using the suspension member.) In one embodiment of suspension member 180, the length of side 181 is 47 inches and the length of mounting arms 180a, 180b is 15 inches.

The suspension member 180 as illustrated in FIG. 1D may be used, in an embodiment, for storing a show box of the type discussed earlier, where the show box may be removably suspended from the suspension member. Optionally, attachment points 181a, 181b may be secured to ends of side 181, preferably by welding thereto. In one approach, attachment points 181a, 181b are formed from the above-discussed hollow metal tubes, with both a front and back end left open, such that a chain or other connector can be looped therethrough or connected thereto. In this approach, ends of the chain or other connector can be attached to the show box to secure it to the suspension member 180. Some show boxes, for example, are configured with an attached chain on each end, and most are configured with handles on each end. Accordingly, an attached chain may be looped through attachment point 181a or 181b and back to its attachment point on the show box. Or, in another approach, a separate connector may be used to connect attachment point 181a or 181b to a handle or other portion of the show box. (See also the illustration in FIG. 7, which is further discussed below.) Preferably, the show box hangs from the front side of the apparatus, although it may alternatively hang from the back side.

In addition to using optional suspension member 180 for storing a show box, an apparatus configured with the optional suspension member 180 in place may be used for hauling a show box as noted earlier. It should also be noted that the suspension member 180, when detached from frame portion 110, may be stored upon the disclosed apparatus by hanging it from the apparatus using supports 130 or 131.

In a further option, illustrated in FIG. 1E, an optional tab 195 is affixed to frame portion 110. Using tab 195, other supplies (such as an oscillating fan) may be hauled and/or stored by attaching such item to tab 195 or hanging such item from tab 195. Tab 195 is preferably formed from steel or other metal, and is preferably attached to frame portion 110 by welding.

Figure 2:
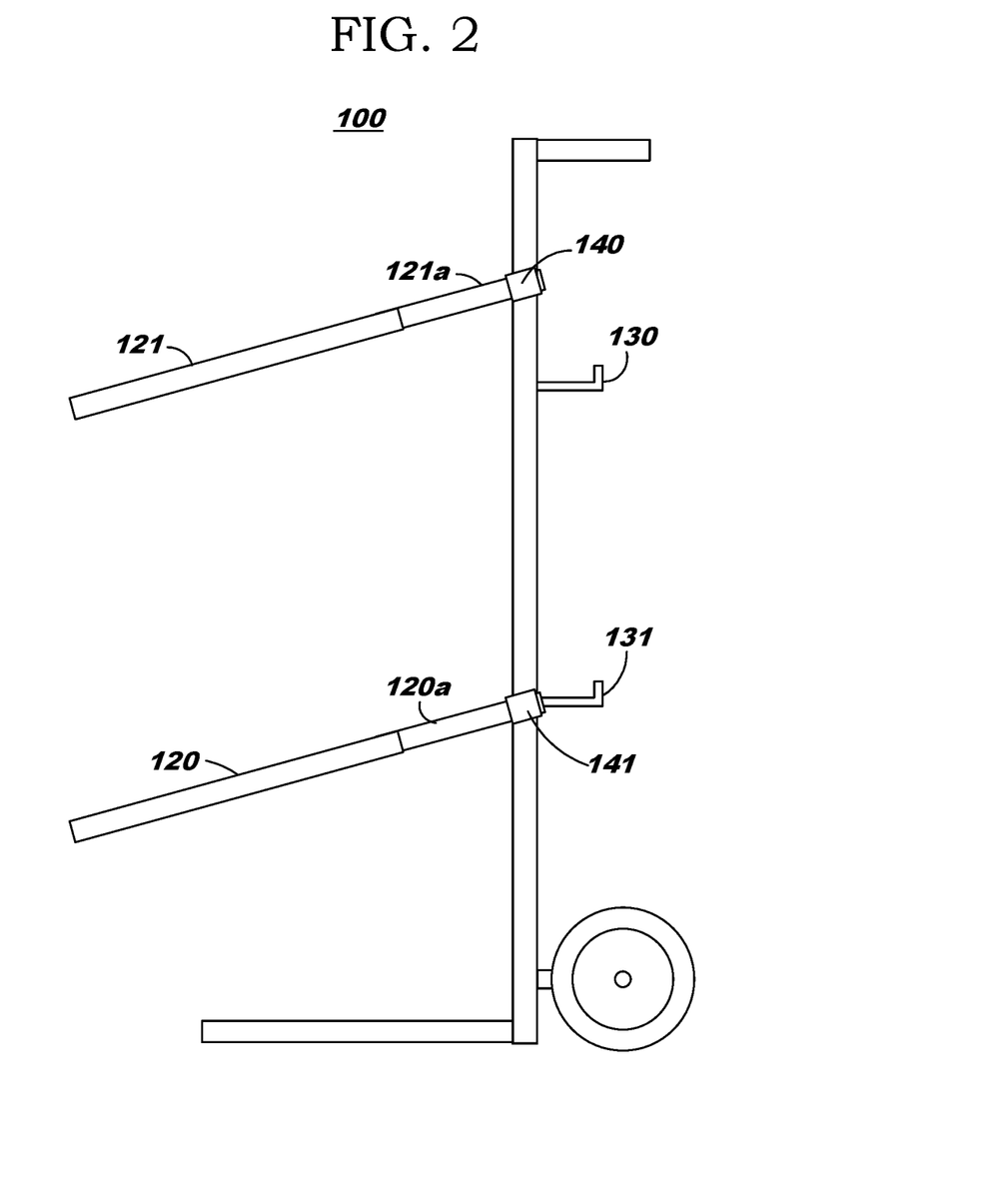
FIG. 2 depicts another side view of the apparatus shown in FIG. 1, illustrating how the racks (which were shown as stored on the back of the apparatus in FIG. 1) may be removably attached to the front of the apparatus using provided points of attachment.

Referring now to FIG. 2, the detachable racks 120, 121 are depicted as being attached to the apparatus 100 in a configuration where each rack 120, 121 is usable for suspending therein a plurality of buckets. As discussed above with reference to FIGS. 1 and 1C, an embodiment of apparatus 100 is configured with pairs of mounting brackets 140, 141 and racks 120, 121 are configured with pairs of mounting arms 120a, 120b and 121a, 121b. An outer dimension of the mounting arms is chosen so as to removably slide within the mounting brackets. Accordingly, FIG. 2 illustrates rack 121 as being removably attached to the apparatus 100 by sliding the mounting arm 121a into mounting bracket 140 while rack 120 is simultaneously removably attached to the apparatus 100 by sliding the mounting arm 120a into mounting bracket 141 (noting, in the illustration, that a terminal end of the mounting arms is shown as extending somewhat beyond the back end of its corresponding mounting bracket).

As illustrated by FIG. 2, the downward angle of the mounting brackets 140, 141 in a preferred embodiment is selected such that it causes the racks to sit at a slightly downward angle when mounted in the apparatus, thereby enabling contents of the buckets to be conveniently accessed while the buckets are held by the racks. (See also FIGS. 5-7, which illustrate a perspective view of embodiments of the apparatus and the position of the racks.) The downward angle of the mounting brackets was discussed earlier as preferably being 15 degrees from horizontal; however, the downward angle may be altered without deviating from the scope of the present invention.

Preferably, the mounting brackets and mounting arms are configured with corresponding holes, such that a bolt or other secure connector can be dropped into a top hole of a mounting bracket, continuing through the hole of a mounting arm, and extending through a bottom hole of the mounting bracket. (See FIG. 1C, where circular holes in the mounting arms are illustrated, and FIGS. 5 and 6, where a circular top of such connector is illustrated.) A nut or cotter pin (as examples of fasteners) may be placed on the lower portion of the connector for added assurance that the connector will not come loose while in use.

Figure 2A:
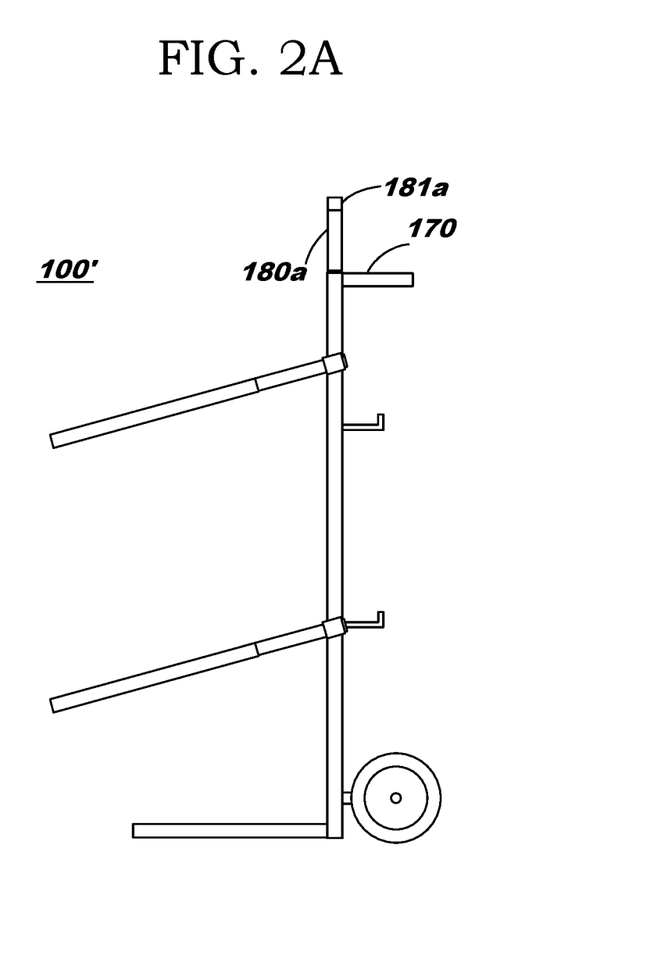
FIG. 2A depicts a side view of an embodiment of the apparatus shown in FIG. 1, now augmented to include the optional aspect illustrated in FIG. 1D.

Referring now to FIG. 2A, a side view is depicted of an embodiment of the apparatus shown in FIG. 1, now augmented as apparatus 100' to include the optional suspension member aspect illustrated in FIG. 1D. Accordingly, FIG. 2A illustrates how mounting arm 180a extends from an open terminal end of frame portion 110, the mounting arm 180a having attached thereto side 181 and its attachment point 181a (noting that side 181 is located behind attachment point 181a, in this side view, and is therefore not visible). Similarly, mounting arm 180b is attached to side 181, as depicted in FIG. 1D, although mounting arm 180b is not visible in FIG. 2A.

Figure 2B:
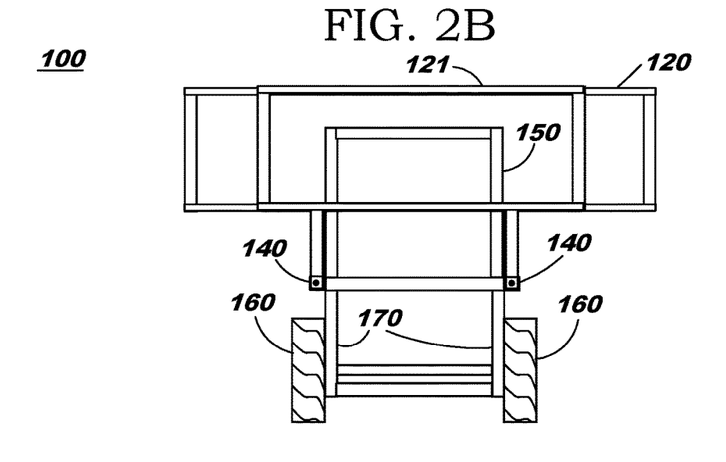
FIG. 2B depicts a top view of the apparatus shown in FIG. 2.
Figure 2C:
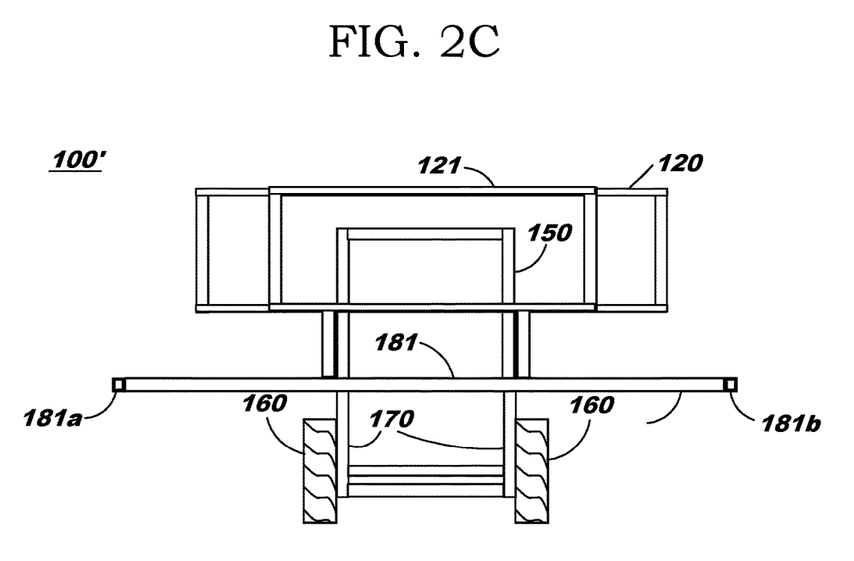
FIG. 2C depicts a top view of the augmented apparatus shown in FIG. 2A.

FIG. 2B depicts a top view of the apparatus 100 shown in FIG. 2, and FIG. 2C depicts a top view of the augmented apparatus 100' shown in FIG. 2A. In both FIGS. 2B and 2C, racks 120, 121 are shown, as well as base portion 150 and wheels 160. In FIG. 2C, the suspension member 180 is in place, and a top view thereof is illustrated by side 181. FIG. 2C also depicts the optional attachment points 181a, 181b. It will be noted than an overall size of the suspension member 180 can be changed by adjusting the length of side 181 and/or the length of mounting arms 180a, 180b.

Figure 3:
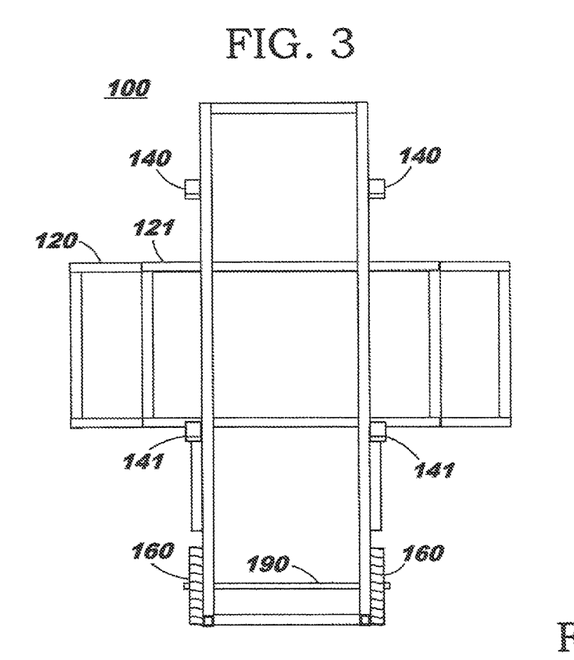
FIG. 3 depicts a front view of the apparatus as illustrated in FIG. 1.

FIG. 3 depicts a front view of the apparatus 100 as illustrated in FIG. 1, in which the racks 120, 121 are hanging from the back of the apparatus using the support members 130, 131 (which are not visible in FIG. 3). In this view, both wheels 160 are now visible, along with an axle 190 that extends therebetween and on which the wheels rotate. FIG. 3 also shows mounting brackets 140, 141, and illustrates differing length of racks 120, 121.

Figure 4:
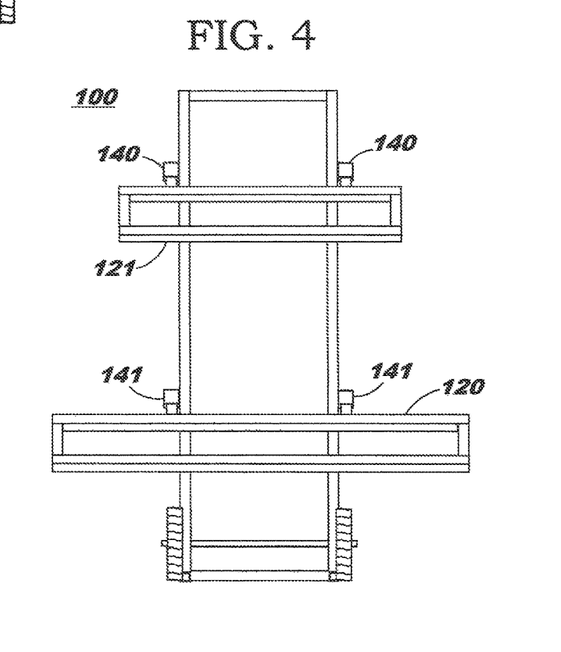
FIG. 4 depicts a front view of the apparatus as illustrated in FIG. 2.
Figure 5:
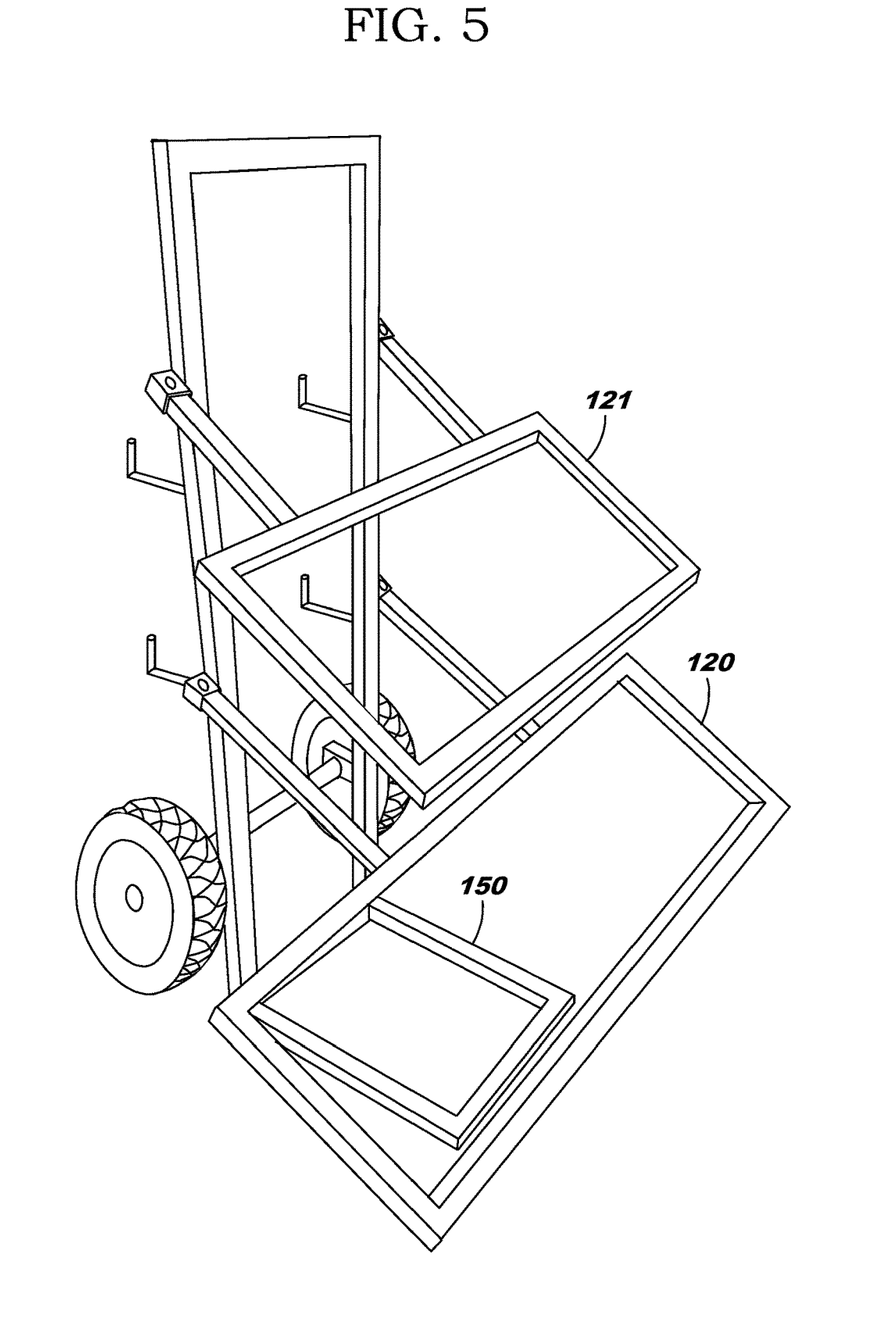
FIG. 5 depicts a perspective view thereof.

FIG. 4 depicts a front view of the apparatus 100 as illustrated in FIG. 2, now showing the racks 121, 120 as being removably attached to the front of the apparatus using mounting brackets 140, 141 as points of attachment. FIG. 5 depicts a perspective view thereof. FIG. 5 illustrates racks 121, 120 as being angled downward when attached (as has been discussed), and shows a relative position of the racks with regard to the horizontal base 150.

FIG. 6 depicts a perspective view in which a plurality of 5-gallon buckets are suspended in racks 120, 121 of an embodiment of apparatus 100. In this example, it can be seen that 2 round buckets 610 are suspended in rack 121 while 3 square buckets 620 are suspended in rack 120. (FIG. 6 also depicts the optional handle portion 170.) It can be seen that an embodiment of the present invention provides for convenient storage of supplies in suspended containers, while still allowing easy access thereto, using a configuration that may be particularly beneficial in view of limited floor space.

FIG. 7 depicts an augmented perspective view of an embodiment 100" in which a plurality of buckets are suspended in racks 120, 121 and in which a show box 700 is suspended from the suspension member 180 that was described above as an optional aspect with reference to FIG. 1D. FIG. 7 also depicts how a chain 710 may be used to secure show box 700 to apparatus 100" by connecting one end of chain 710 to a handle or attachment point 720 on the show box and by connecting the other end of chain 710 to attachment point 181a.

It should be noted that the figures are directed toward illustrating aspects of the present invention, in combination with descriptions herein, and aspects shown therein are not necessarily drawn to scale.

As has been demonstrated, embodiments of the present invention provide an improved apparatus for hauling and/or storing supplies. The removably attachable racks, as has been described, may be conveniently stored on the provided supports when detached, and the optional removably attachable suspension member may also be stored on the provided supports when detached. In a preferred embodiment, the racks are configured to be capable of holding a mixture of shapes of containers. Use of hollow metal tubes for the mounting brackets and the frame portion, as discussed above, provides for convenient removable attachment of the racks and the suspension member, respectively. Notably, a benefit of the disclosed apparatus is that the racks and the supplies they hold do not need to be removed from the apparatus while it is transported (for example, in a vehicle or trailer), yet the apparatus is flexibly designed for easy and convenient detachment of the racks and their storage thereupon. The disclosed apparatus is easy to use and to maneuver. Forming the apparatus from steel tubes, as discussed above, provides a sturdy and durable solution to both storing supplies and hauling supplies.

It should be noted that various features discussed herein with reference to "an embodiment", "one embodiment", "a preferred embodiment", and so forth should not be construed as suggesting that each such feature is present in a single embodiment, or in every embodiment, of the present invention. Instead, it should be understood that there may be various combinations of the disclosed features present in any particular embodiment.

While embodiments of the present invention have been described, additional variations and modifications in those embodiments may occur to those skilled in the art once they learn of the basic inventive concepts. Therefore, it is intended that the appended claims shall be construed to include the described embodiments and all such variations and modifications as fall within the spirit and scope of the invention.

The invention claimed is:

1. An apparatus, comprising:
a vertical frame portion, the vertical frame portion configured with at least one pair of mounting brackets, the mounting brackets of the pair being fixedly attached to opposing sides of the vertical frame portion at a particular vertical height, the mounting brackets of the pair adapted for removable attachment of a storage rack, the storage rack comprising an open frame in which at least one container for holding supplies is suspendable and configured with a pair of mounting arms extending from the open frame in a perpendicular direction and coplanar therewith, wherein an outer dimension of the mounting arms is adapted for removably sliding within the mounting brackets to provide the removable attachment;
a horizontal base portion fixedly attached to a bottom end of the vertical frame portion;
a pair of rotatable wheels connected to an axle, the axle being connected to the vertical frame portion; and
at least one pair of support members fixedly attached to the vertical frame portion for hanging the storage rack therefrom when detached, the support members of the pair being fixedly attached to opposing sides of the vertical frame portion at a same vertical height.

2. The apparatus according to claim 1, wherein the axle is placed such that the wheels and the horizontal base portion simultaneously contact a horizontal surface when the apparatus is upright.

3. The apparatus according to claim 1, wherein:
the vertical frame portion is configured with two pairs of mounting brackets, the mounting brackets of the first pair being fixedly attached to opposing sides of the vertical frame portion at a first vertical height and the mounting brackets of the second pair being fixedly attached to opposing sides of the vertical frame portion at a second vertical height, the mounting brackets of the first pair adapted for removable attachment therewith of a first storage rack and the mounting brackets of the second pair adapted for removable attachment therewith of a second storage rack, the first storage rack and the second storage rack each comprising an open frame in which at least one container for holding supplies is suspendable and each configured with a pair of mounting arms extending from the open frame in a perpendicular direction and coplanar therewith, wherein an outer dimension of the mounting arms of the first frame is adapted for removably sliding within the mounting brackets of the first pair and an outer dimension of the mounting arms of the second frame is adapted for removably sliding within the mounting brackets of the second pair; and
the pair of support members is adapted for simultaneously hanging the first storage rack when detached and the second storage rack when detached.

4. The apparatus according to claim 1, further comprising a second pair of support members for supporting the hanging storage rack.

5. The apparatus according to claim 1, further comprising a handle portion attached to a top end of the vertical frame portion.

6. The apparatus according to claim 1, wherein the opposing sides of the vertical frame portion each have an open terminal end at a top end thereof, and further comprising a removably attachable suspension member adapted for suspending supplies from the apparatus when attached thereto, the suspension member comprising a side member configured with a pair of suspension member mounting arms extending perpendicularly therefrom and coplanar therewith, wherein an outer dimension of the suspension member mounting arms is adapted for removably sliding within the open terminal ends of the frame portion to provide the removable attachment of the suspension member.

7. The apparatus according to claim 6, wherein the pair of support members is adapted for simultaneously hanging the storage rack when detached and the suspension member when detached.

8. The apparatus according to claim 1, further comprising a tab portion, the tab portion affixed to the vertical frame portion and adapted for removably suspending an element therefrom.

9. The apparatus according to claim 1, wherein the at least one container comprises a bucket for holding the supplies.

10. The apparatus according to claim 1, wherein the storage rack is adapted for interchangeably suspending therein a plurality of container shapes, the container shapes selected from the group consisting of a square shape and a round shape.

11. The apparatus according to claim 10, wherein a container having the square shape comprises a square bucket and a container having the round shape comprises a round bucket.

12. The apparatus according to claim 10, wherein a container having the square shape comprises a 5-gallon square bucket and a container having the round shape comprises a 5-gallon round bucket.

13. The apparatus according to claim 1, wherein the storage rack comprises an open frame in which a plurality of containers are suspendable.

14. The apparatus according to claim 1, wherein the mounting arms of the pair both extend from the open frame in a same perpendicular direction.

15. The apparatus according to claim 1, wherein:
the vertical frame portion is configured with two pairs of mounting brackets, the mounting brackets of the first pair being fixedly attached to opposing sides of the vertical frame portion at a first vertical height and the mounting brackets of the second pair being fixedly attached to opposing sides of the vertical frame portion at a second vertical height, the mounting brackets of the first pair adapted for removable attachment therewith of a first storage rack and the mounting brackets of the second pair adapted for removable attachment therewith of a second storage rack, the first storage rack and the second storage rack each comprising an open frame in which a plurality of containers for holding supplies is suspendable, the first storage rack and the second storage rack each configured with a pair of mounting arms extending from their respective open frame in a perpendicular direction and coplanar therewith, wherein an outer dimension of the mounting arms of the first frame is adapted for removably sliding within the mounting brackets of the first pair and an outer dimension of the mounting arms of the second frame is adapted for removably sliding within the mounting brackets of the second pair; and
the pair of support members is adapted for simultaneously hanging the first storage rack when detached and the second storage rack when detached.

16. An apparatus, comprising:
a vertical frame portion, the vertical frame portion configured with two pairs of mounting brackets, the mounting brackets of each pair being fixedly attached to opposing sides of the vertical frame portion at a corresponding particular vertical height, the mounting brackets of each pair adapted for removable attachment of a first storage rack and a second storage rack, the storage racks each comprising an open frame in which a plurality of containers for holding supplies are suspendable and configured with a pair of mounting arms extending from the open frame in a perpendicular direction and coplanar therewith, wherein an outer dimension of the mounting arms is adapted for removably sliding within the mounting brackets to provide the removable attachment;
a horizontal base portion fixedly attached to a bottom end of the vertical frame portion;
a pair of rotatable wheels connected to an axle, the axle being connected to the vertical frame portion; and
at least one pair of support members fixedly attached to the vertical frame portion for hanging the storage racks therefrom when detached, the support members of the pair being fixedly attached to opposing sides of the vertical frame portion at a same vertical height.

17. A method for hauling and storing supplies, comprising:
storing a plurality of supplies upon an apparatus, the apparatus configured to comprise:
a vertical frame portion, the vertical frame portion configured with at least one pair of mounting brackets, the mounting brackets of the pair being fixedly attached to opposing sides of the vertical frame portion at a particular vertical height, the mounting brackets of the pair adapted for removable attachment of a storage rack, the storage rack comprising an open frame in which a plurality of containers for holding the supplies is suspendable and configured with a pair of mounting arms extending from the open frame in a perpendicular direction and coplanar therewith, wherein an outer dimension of the mounting arms is adapted for removably sliding within the mounting brackets to provide the removable attachment;
a horizontal base portion fixedly attached to a bottom end of the vertical frame portion;
a pair of rotatable wheels connected to an axle, the axle being connected to the vertical frame portion; and
at least one pair of support members fixedly attached to the vertical frame portion for hanging the storage rack therefrom when detached, the support members of the pair being fixedly attached to opposing sides of the vertical frame portion at a same vertical height; and
hauling the supplies from a first physical location to a second physical location while the supplies are stored upon the apparatus.

18. The method according to claim 17, wherein:
the vertical frame portion is configured with two pairs of mounting brackets, the mounting brackets of the first pair being fixedly attached to opposing sides of the vertical frame portion at a first vertical height and the mounting brackets of the second pair being fixedly attached to opposing sides of the vertical frame portion at a second vertical height, the mounting brackets of the first pair adapted for removable attachment of a first storage rack and the mounting brackets of the second pair adapted for removable attachment of a second storage rack, the first storage rack and the second storage rack each comprising an open frame in which a plurality of containers for holding the supplies is suspendable, the first storage rack and the second storage rack each configured with a pair of mounting arms extending from their respective open frame in a perpendicular direction and coplanar therewith, wherein an outer dimension of the mounting arms of the first frame is adapted for removably sliding within the mounting brackets of the first pair and an outer dimension of the mounting arms of the second frame is adapted for removably sliding within the mounting brackets of the second pair; and
the pair of support members is adapted for simultaneously hanging the first storage rack when detached and the second storage rack when detached.

19. The apparatus according to claim 1, wherein:
the at least one pair of mounting brackets is fixedly attached to the opposing sides of a front side of the vertical frame portion; and
the at least one pair of support members is fixedly attached to the opposing sides of a back side of the vertical frame portion.

20. The method according to claim 17, wherein the storing further comprises:
attaching the storage rack to the vertical frame portion, the attaching further comprising sliding the mounting arms of the storage rack into the mounting brackets; and
suspending, within the open frame of the storage rack, each of the plurality of containers.

21. The method according to claim 17, further comprising:
removing, from the open frame of the storage rack, the plurality of suspended containers;
detaching the storage rack from the vertical frame portion, the detaching further comprising removing the mounting arms of the storage rack from the mounting brackets; and
hanging the detached storage rack from the apparatus using the at least one pair of support members.

22. The apparatus according to claim 16, wherein:
the first storage rack is sized for simultaneously suspending therein 2 containers; and
the second storage rack is sized for simultaneously suspending therein 3 containers.

23. The apparatus according to claim 16, wherein:
the first storage rack is sized for simultaneously suspending therein 2 containers; and
the second storage rack is sized for simultaneously suspending therein 2 containers.

24. The apparatus according to claim 16, wherein:
the first storage rack is sized for simultaneously suspending therein 3 containers; and
the second storage rack is sized for simultaneously suspending therein 3 containers.

25. The apparatus according to claim 16, wherein:
the first storage rack is sized for simultaneously suspending therein a first plurality of containers and the second storage rack is sized for simultaneously suspending therein a second plurality of containers, thereby configuring the apparatus to support a first storage capacity; and
the apparatus is a configurable to support a second storage capacity by replacing the first storage rack with a third storage rack sized for simultaneously suspending therein a third plurality of containers, the third plurality being different in number from the first plurality, the third storage rack comprising an open frame in which the third plurality of containers is suspendable and configured with a pair of mounting arms extending from the open frame in the perpendicular direction and coplanar therewith, wherein an outer dimension of the mounting arms is adapted for removably sliding with the mounting brackets.

26. The apparatus according to claim 16, wherein:
the apparatus comprises two pairs of support members fixedly attached to the vertical frame, the support members of each of the pairs being fixedly attached to opposing sides of a back of the vertical frame portion, the support members of the first pair fixedly attached at a first vertical height and the support members of the second pair fixedly attached at a second vertical height;
the first pair of support members is adapted for hanging therefrom a top edge of the first storage rack when detached from the first pair of mounting brackets and for hanging therefrom a top edge of the second storage rack when detached from the second pair of mounting brackets; and
the second pair of support members is adapted for supporting a bottom edge of the first storage rack and a bottom edge of the second storage rack when the respective top edges hang from the first pair of support members.

27. The apparatus according to claim 16, wherein the first storage rack and the second storage rack are secured within respective pairs of the mounting brackets into which the mounting arms have been slid by placing, in each mounting bracket, a secure connector, each secure connector passing through a first hole in a top of the mounting bracket, a hole in the respective mounting arm, and a second hole in a bottom of the mounting bracket.

* * * * *